United States Patent [19]

Lawrence

[11] Patent Number: 5,123,027
[45] Date of Patent: Jun. 16, 1992

[54] REGENERATIVE PASSIVE RESONATOR

[75] Inventor: Anthony W. Lawrence, Walpole, Mass.

[73] Assignee: Northrop Corporation, Hawthorne, Calif.

[21] Appl. No.: 538,370

[22] Filed: Jun. 13, 1990

[51] Int. Cl.⁵ .............................................. G02B 6/10
[52] U.S. Cl. ...................................... 372/92; 385/30; 356/350; 372/7; 372/40; 372/94; 359/333
[58] Field of Search ................... 356/350; 350/96.12, 350/96.17; 330/4.3; 372/7, 40, 41, 93, 94

[56] References Cited

U.S. PATENT DOCUMENTS

| | | | |
|---|---|---|---|
| 3,743,962 | 7/1973 | Rosenberg | 372/7 |
| 3,760,297 | 9/1973 | Thompson | 372/94 |
| 3,786,368 | 1/1974 | Bjorkholm et al. | 372/7 X |
| 3,974,454 | 9/1976 | Sturel | 372/66 X |
| 4,039,260 | 8/1977 | Redman | |
| 4,059,337 | 11/1977 | Winzer et al. | 350/96 |
| 4,087,159 | 5/1978 | Ulrich | 350/96.12 |
| 4,326,803 | 4/1982 | Lawrence et al. | 356/350 |
| 4,658,401 | 4/1987 | Segré et al. | 372/26 |
| 4,674,881 | 6/1987 | Lawrence et al. | 356/350 |
| 4,676,583 | 6/1987 | Hicks, Jr. | 350/96.15 |
| 4,851,368 | 7/1989 | Behfer-Rad et al. | 372/94 X |
| 4,910,571 | 3/1990 | Kasahara et al. | 357/30 |
| 5,001,523 | 3/1991 | Lomashevich et al. | 357/19 |

OTHER PUBLICATIONS

"Neodymium-Doped Single-Mode Optical Fibre", 1987 York VSOP Ltd.
"Application Note FL1/87-Deodymium-Doped Fibre Lasers", 1987 York VSOP Ltd.

Primary Examiner—William L. Sikes
Assistant Examiner—Galen J. Hansen
Attorney, Agent, or Firm—Terry J. Anderson; Robert B. Block; Karl J. Hoch, Jr.

[57] ABSTRACT

In a thin film micro-optic gyroscope (MOG) (10) a waveguide resonator structure (14) has an optical transmission path formed within a surface of a substrate (12). In one embodiment the path includes a predetermined amount of dopant (12a) for providing regenerative gain to radiation of a predetermined wavelength propagating through the path. The dopant is provided at a predetermined concentration and is substantially uniformly distributed throughout the path. By example, the substrate is comprised of neodymium-doped glass. A pump source is optically coupled to the path for exciting the dopant to emit radiation, the pump source providing radiation at a wavelength of approximately one-half of the predetermined wavelength. For the example of neodymium-doped glass the predetermined wavelength is 1.06 microns. The resulting regenerative resonator improves the quality of integrated optic resonators used in the MOG by providing a small amount of gain to the resonator to compensate for the optical signal lost by scattering, radiation and absorption.

22 Claims, 2 Drawing Sheets

REGENERATIVE PASSIVE RESONATOR

FIELD OF THE INVENTION

This invention relates generally to optical waveguide resonators and, in particular, to an integrated optical resonator employed with a micro-optic gyroscope.

BACKGROUND OF THE INVENTION

Commonly assignee U.S. Pat. No. 4,326,803, issued Apr. 27, 1982 and commonly assigned U.S. Pat. No. 4,674,881, issued Jun. 23, 1987 disclose thin film laser gyroscopes, also known as micro-optic gyroscopes (MOGs). The MOG includes a thin-film passive resonator waveguide that provides a closed, substantially circular propagation path for optical signals. The resonator waveguide is fabricated upon or within a surface of a substrate and is typically 1–2 microns in depth, 5–10 microns in width and has an overall diameter of approximately 10 centimeters.

A finesse of the resonator is represented by (q) and is a measure of the quality factor of the resonator. Finesse may be determined in accordance with the expression:

q=FSR/L, where FSR is the free spectral range of the resonator and L is the line width between adjacent half-power points on the resonance curve.

A high finesse resonator is realized only if optical losses are maintained below a few percent. This results in a requirement that a dielectric waveguide have a distributed loss of approximately $10^{-2}$ to $10^{-3}$ dB/cm. For a 10 cm ring, guide loss is thus 0.3 dB to 0.03 dB. Using $5 \times 10^{-3}$ dB/cm as an example, waveguide loss is 0.16 dB or 3.7%. As a result, and assuming one percent input-output coupling, the finesse is approximately 100.

However, a waveguide loss of $5 \times 10^{-3}$ dB/cm is difficult to achieve using conventional passive resonator waveguides.

In U.S. Pat. No. 3,974,454, issued Aug. 10, 1976 and entitled "Laser Amplifiers" B. Sturel describes an improvement realized in a neodymium glass optical amplifier by shaping it in a particular way such that diffraction effects are minimized.

In U.S. Pat. No. 4,676,583, issued Jun. 30, 1987 and entitled "Adscititious Resonator" J. W. Hicks, Jr. describes fiber optic resonators and an adscititious cavity doped with a gain material such as neodymium (Nd). However, this discussion is made in the context of filtering out, or absorbing, light of a particular wavelength from a fiber optic data bus.

It is thus an object of the invention to provide a micro-optic gyroscope having a high finesse.

It is another object of the invention to provide a micro-optic gyroscope having an optical path with a predetermined amount of regenerative gain.

It is a further object of the invention to provide a micro-optic gyroscope having an optical path comprised of Nd-doped glass for providing regenerative optical gain.

SUMMARY OF THE INVENTION

The foregoing problems are overcome and the objects of the invention are realized by, in a micro-optic thin film gyroscope, a waveguide resonator structure having an optical transmission path formed within a surface of a substrate. In one embodiment the path includes a predetermined amount of dopant for providing regenerative gain to radiation of a predetermined wavelength propagating through the path. The dopant is provided at a predetermined concentration and is substantially uniformly distributed throughout the path. By example, the substrate is comprised of neodymium-doped glass. A pump source is optically coupled to the path for exciting the dopant to emit radiation. In accordance with one embodiment of the invention the pump source provides radiation at a wavelength of approximately 0.5 microns to approximately 0.8 microns for the example of neodymium-doped glass for which the predetermined wavelength is 1.06 microns.

The resulting regenerative resonator improves the quality of integrated optic resonators used in the MOG by providing a small amount of gain to the resonator to compensate for the optical signal lost by scattering, radiation and absorption.

BRIEF DESCRIPTION OF THE DRAWING

The above set forth and other features of the invention are made more apparent in the ensuing Detailed Description of a Preferred Embodiment of the Invention when read in conjunction with the attached Drawing, wherein:

FIG. 1b is a cross-sectional view through the resonator waveguide of FIG. 1a;

DETAILED DESCRIPTION OF PREFERRED EMBODIMENTS OF THE INVENTION

The ensuing description shows that a high finesse waveguide resonator is achieved by doping the waveguide with an active material that adds stimulated emission regenerative gain.

The resulting regenerative resonator improves the quality of integrated optic resonators used in the MOG by providing a small amount of gain in the resonator to offset the signal lost by scattering, radiation, and absorption. Preferably the MOG waveguide is doped with a rare earth element such as neodymium and is optically pumped by a GaAlAs CW diode laser. However, it is within the scope of the invention to provide regeneration in any manner that provides some predetermined amount of gain to the resonator waveguide.

The performance of the MOG depends directly on the amount of loss in the resonator. Thus, it is a major intent of regeneration to reduce round trip losses. However, if the amount of regeneration is excessive the round trip gain exceeds the round trip loss and the waveguide will resonate as a ring laser. In this condition the counter-propagating waves will detrimentally lock together at low rotation rates, thereby making the gyro inoperative.

Figure 1A:
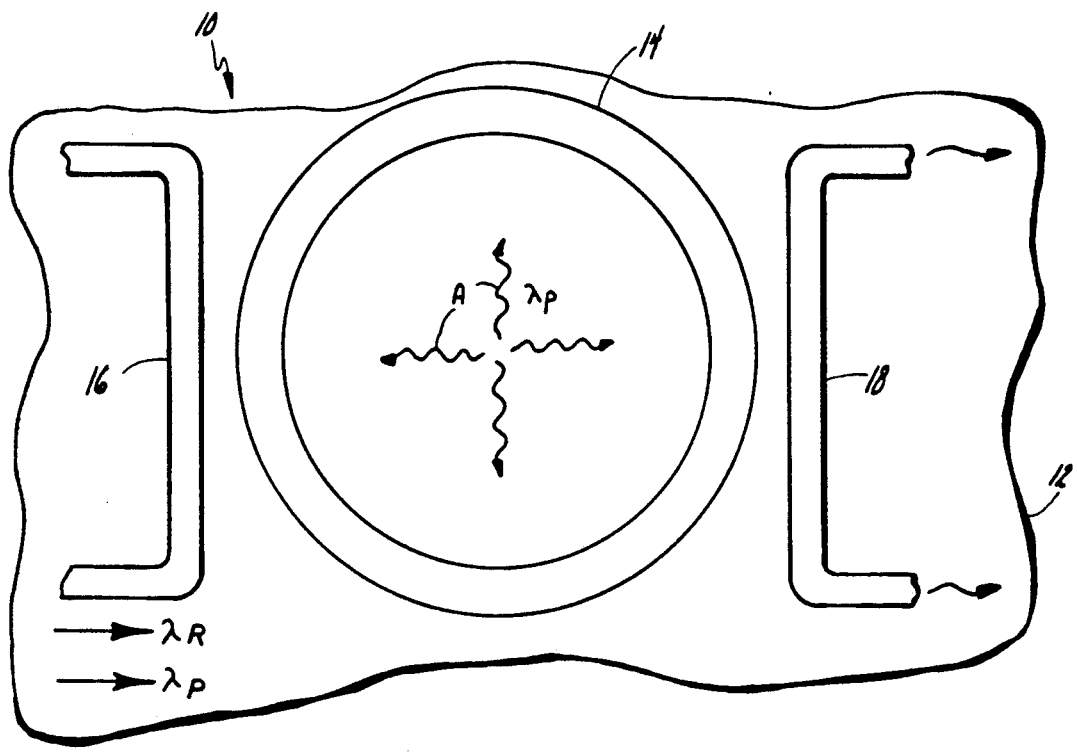
FIG. 1a is a top simplified view, not to scale, of a portion of a MOG showing the resonator waveguide.
Figure 1B:
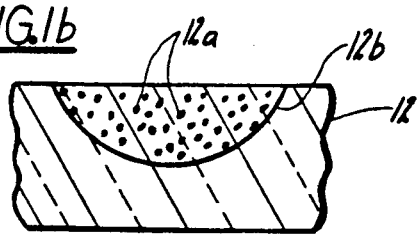

FIG. 1a illustrates a top view of a portion of a MOG 10. The MOG 10 is fabricated within a substrate 12 and includes a resonator waveguide 14 comprised of, in accordance with one embodiment of the invention, an optical material doped with a substance selected to provide a predetermined level of optical gain. By example, and referring also to FIG. 1b, the substrate 12 is comprised of glass doped with molecules 12a of a rare earth such as neodymium. Within the neodymium-doped glass the resonator waveguide 14 is defined by region 12b having a higher index of refraction than the glass outside of the region 12b. Typical dimensions of the waveguide 14 are a depth of approximately 1-2 microns, a width of approximately 5-10 microns and an overall diameter in the range of 3 to 10 centimeters.

The waveguide region 12b is formed within the glass substrate 12 by an ion-exchange process or by some other suitable process. In this illustration an input coupler waveguide 16 and an output coupler waveguide 18 are provided in proximity to the resonator waveguide 14 for coupling optical energy into and out of, respectively, the resonator waveguide 14. FIG. 1a illustrates what is known as a transmission mode of operation. By example, the input coupler 16 conveys radiation having a wavelength associated with a resonance probe ($\lambda_R$), such as 1.06 microns.

An alternate method of excitation employs a single coupler (24 of FIG. 3) in which case the resonator is used in the reflection mode. In the transmission mode the detectors are operated to seek a maximum while in the reflection mode the detectors are operated to seek a minimum.

In one embodiment the input coupler also conveys radiation having a wavelength associated with an optical pump ($\lambda_P$), such as 0.8 microns, for stimulating the gain material that dopes the waveguide region 12b. The Nd ions strongly absorb the pump radiation, reducing the pump intensity at the detector.

In another embodiment the optical pump radiation is provided uniformly to the gain material of the waveguide 14 as indicated by the arrows A. This has the advantage that the intensity of the pump light at the detectors is minimized, thereby increasing the gyro sensitivity.

In either embodiment the pump radiation is selected to have a wavelength that is absorbed by the dopant while not being a wavelength that is a resonant wavelength of the resonator waveguide.

As an example of the construction of the resonator waveguide 14 the substrate 12 is comprised of a neodymium-doped glass of a type manufactured by Hoya and other suppliers. By example, a neodymium-doped single-mode optical fiber is available from York. This fiber has a core composition of $SiO_2$-$GeO_2$ glass containing $Nd^{3+}$ ions. The waveguide region 12b is preferably formed by an ion-exchange process and has a depth of 4-7 microns and a width at a top surface of the the substrate 12 of approximately 5-8 microns. The waveguide 14 has a diameter of 3-10 cm depending on the MOG performance required.

By example, and assuming that the waveguide loss is (−)0.1 dB/cm, the active dopant 12a is required to provide a gain of (+)0.095 dB/cm such that the overall waveguide distributed loss approaches a desired value such as $5\times10^{-3}$ dB/cm as indicated above. For this example: ($+0.095-0.1 = -0.005$ dB/cm).

The required amount of gain can be provided in many ways, most simply by adding a known "lasing material" such as $Nd^{3+}$ as a dopant as described above. The dopant is dispersed in the material of the waveguide and is optically excited by a conventional incoherent source such as a flashlamp or LED. If desired, a coherent pump source such as a GaAlAs diode laser can be employed. In that spontaneous emission from the dopant increases the background noise of the resonator waveguide 14 the dopant concentration is preferably set to a low value. As a result there is a limit as to the amount of improvement in finesse. However, the obtainable amount, even with a relatively low dopant concentration, is sufficient to significantly improve operation of the MOG.

Figure 2:
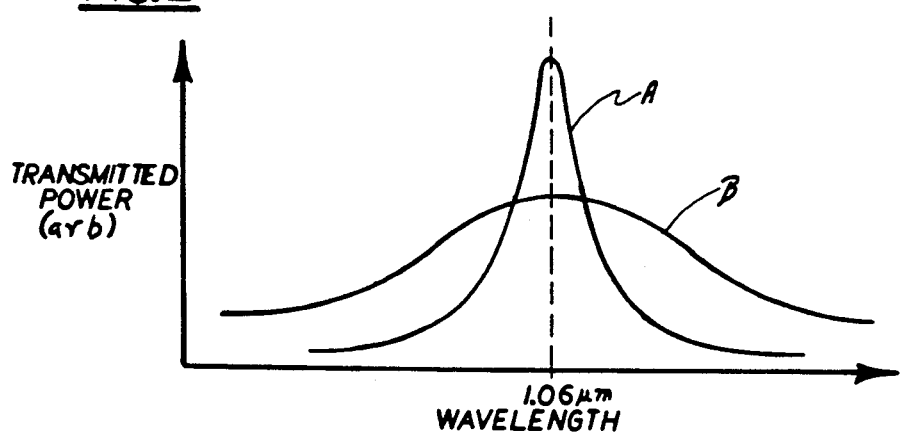
FIG. 2 is a graph that contrasts power transmitted through the resonator both with and without regeneration, the graph particularly illustrating the effect of gain on the resonator finesse.

FIG. 2 is a graph that contrasts power transmitted through the resonator both with and without regeneration, the graph particularly illustrating the effect of gain on the resonator finesse (curve A) as opposed to a waveguide not having regeneration (curve B).

Figure 3:
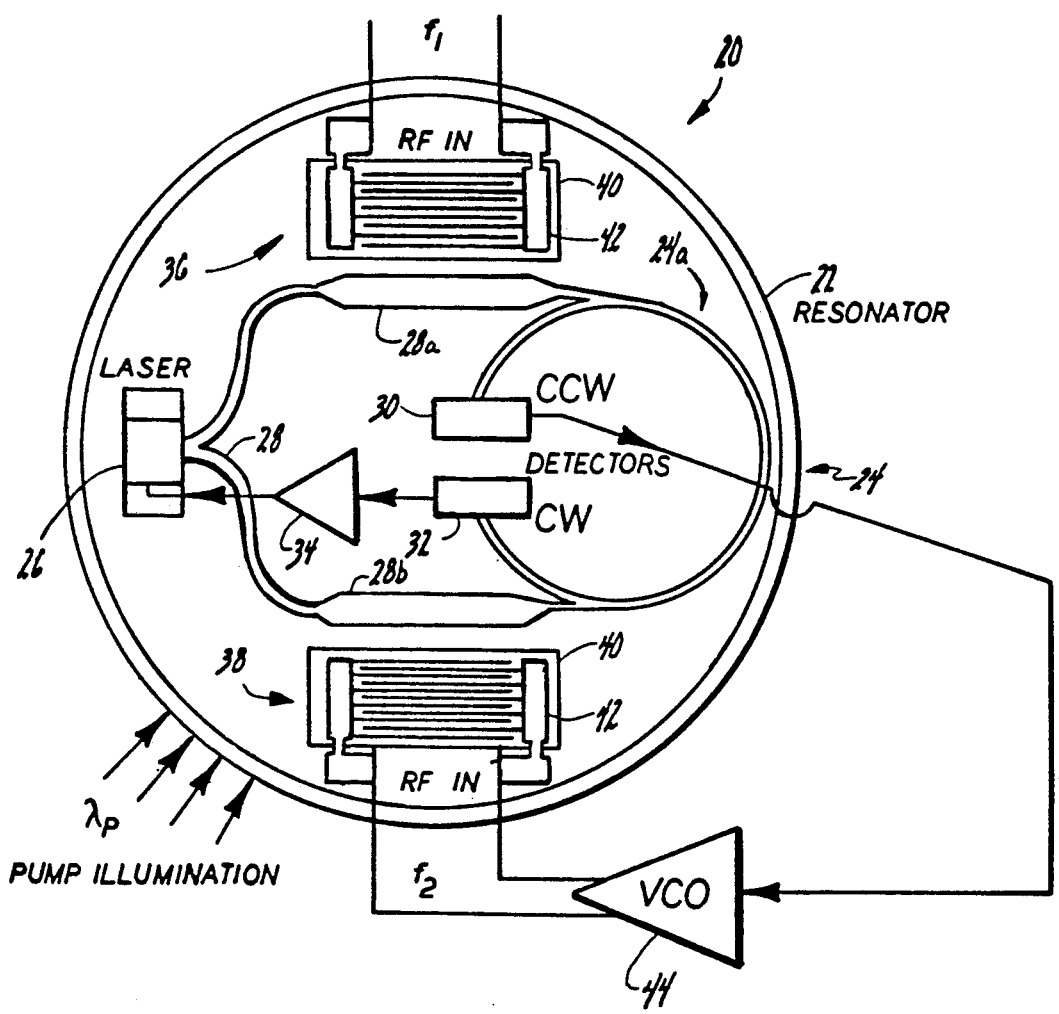
FIG. 3 is a simplified top view of a MOG constructed in accordance with the invention.

FIG. 3 is a top view of a MOG 20 that operates in the reflection mode. MOG 20 includes a resonator 22 having a resonator coupler 24 for coupling to radiation delivery system 24a. Delivery system 24a includes a laser 26 having an output provided to a 3 db splitter 28. The splitter 28 feeds horn sections 28a and 28b. The laser 26 may be a GaAlAs laser diode operating at 840 nm. The laser radiation is provided to a counter-clockwise (CCW) detector 30 and to a clockwise (CW) detector 32. An output of the CW detector 32 is applied to a driver 34 for servo controlling the operation of the laser 26. The MOG 20 includes a CCW frequency shifter 36 and a CW frequency shifter 38 disposed adjacent to the horn sections 28a and 28b for modulating the laser radiation. Each of the frequency shifters is comprised of a zinc oxide pad 40 upon which is fabricated a surface acoustic wave (SAW) transducer 42. An output of the CCW detector 30 is applied to a VCO 44 for varying the RF frequency ($f_2$) that drives frequency shifter 38.

In accordance with the teaching of the invention the circular resonator 22 is fabricated to include $Nd^{3+}$ ions for providing regenerative gain to radiation propagating through the resonator 22 waveguide. A source of pump radiation is supplied to the resonator 22 waveguide for stimulating the $Nd^{3+}$ ions. The pump illumination has a wavelength within a range of wavelengths of approximately 0.5 microns to 0.8 microns for the example of a $Nd^{3+}$-doped glass resonator waveguide 22 having a resonant wavelength of 1.06 microns. The pump wavelength is chosen such that it is not a resonant wavelength of the resonator 22.

For both the transmission mode and reflection mode embodiments shown, if the dopant provides excessive gain the waveguide resonator will function as a ring laser instead of as a passive device and lock-in would be expected to occur. However, lock-in should not occur under passive regenerative conditions with a properly selected dopant concentration. In this regard the dopant concentration is best determined as a function of resonator waveguide geometry, diameter, acceptable noise, operating wavelength and other application-specific characteristics. In general the dopant concentration is selected to be as low as possible to reduce absorption while yet providing sufficient regenerative gain to compensate for waveguide losses.

While the invention has been particularly shown and described with respect to presently preferred embodiments thereof, it will be understood by those skilled in the art that changes in form and details may be made therein without departing from the scope and spirit of the invention.

What is claimed is:

1. A micro-optic thin film gyroscope comprising a waveguide resonator structure defining a closed optical path formed within a substrate, source means for providing radiation of a predetermined wavelength, means for coupling the radiation with the closed optical path, and pump source means for exciting an optically excitable dopant material that is distributed in a predetermined concentration along the closed optical path, the dopant material providing regenerative gain to the radiation upon excitation by the pump source means, the dopant concentration being less than an associated lasing threshold concentration.

2. A micro-optic thin film gyroscope as set forth in claim 1 wherein the substrate comprises neodymium-doped glass having the closed optical path formed therein.

3. A micro-optic thin film gyroscope as set forth in claim 2 and further comprising pump source means optically coupled to the closed optical path for exciting the dopant, the pump source means providing excitation at a wavelength other than a resonant wavelength of the waveguide resonator structure.

4. A micro-optic thin film gyroscope as set forth in claim 2 and further comprising pump source means optically coupled to the closed optical path for exciting the dopant, the pump source means providing excitation at a wavelength within a range of wavelengths of approximately 0.5 microns to approximately 0.8 microns.

5. A micro-optic thin film gyroscope as set forth in claim 1 wherein the coupling means includes a plurality of optical couplers and the waveguide resonator structure is operated in a transmission mode.

6. A micro-optic thin film gyroscope as set forth in claim 1 wherein the coupling means includes a single optical coupler and the waveguide resonator structure is operated in a reflection mode.

7. A micro-optic thin film gyroscope as set forth in claim 1 wherein the substrate comprises neodymium-doped glass material having the closed optical path formed therein by an ion-exchange process, the closed optical path having a higher index of refraction than an index of refraction of material outside of the closed optical path.

8. A micro-optic thin film gyroscope comprising a circular waveguide resonator defining a closed optical path formed within a substrate comprising a neodymium-doped glass material, source means for providing radiation of a predetermined wavelength, means for coupling the radiation with the closed optical path, and pump source means for exciting the doped glass material, the neodymium dopant being distributed in a predetermined concentration, the closed optical path having higher index of refraction than an index of refraction of material outside of the closed optical path for confining therein the radiation in two counter propagating radiation beams, the neodymium-doped glass material within the closed optical path providing regenerative gain to the two counterpropagating radiation beams upon excitation by the pump source means, the regenerative gain compensating for waveguide optical losses, the predetermined concentration being less than an associated lasing threshold concentration.

9. A regenerative passive resonator, comprising:

a circular resonator waveguide formed within a substrate, the resonator waveguide defining a closed optical path for the propagation of radiation around the closed optical path, the propagating radiation having a predetermined wavelength, the resonator waveguide including a deposit of dopant material having a predetermined concentration, the dopant material providing a predetermined amount of regenerative gain to the propagating radiation upon illumination of the dopant material by pumping radiation, the predetermined concentration being less than an associated lasing threshold concentration;

source means for providing the propagating radiation;

means for illuminating the dopant material with the pumping radiation; and means formed within the substrate for coupling the propagating radiation with the closed optical path.

10. A regenerative passive resonator as set forth in claim 9 wherein the predetermined wavelength is approximately 1.06 microns.

11. A regenerative passive resonator as set forth in claim 9 wherein the dopant material comprises a rare earth element.

12. A regenerative passive resonator as set forth in claim 11 wherein the dopant material is distributed uniformly within the substrate.

13. A regenerative passive resonator as set forth in claim 12 wherein the dopant material is neodymium.

14. A regenerative passive resonator as set forth in claim 11 wherein the dopant material is distributed along the closed optical path.

15. A regenerative passive resonator as set forth in claim 14 wherein the dopant material is neodymium.

16. A regenerative passive resonator as set forth in claim 9 wherein the pumping radiation has a wavelength other than a resonant wavelength of the resonator waveguide.

17. A regenerative passive resonator as set forth in claim 16 wherein the pumping radiation has a wavelength within a range of wavelengths of approximately 0.5 microns to approximately 0.8 microns.

18. A regenerative passive resonator as set forth in claim 9 wherein the coupling means conveys the pumping radiation to the resonator waveguide.

19. A regenerative passive resonator as set forth in claim 9 wherein the illuminating means is a laser diode.

20. A regenerative passive resonator as set forth in claim 9 wherein the illuminating means uniformly illuminates the resonator waveguide with the pumping radiation.

21. A regenerative passive resonator as set forth in claim 9 wherein the coupling means comprises a plurality of optical couplers, the resonator operating in a transmission mode.

22. A regenerative passive resonator as set forth in claim 9 wherein the coupling means consists of an optical coupler, the resonator operating in a reflection mode.

* * * * *